United States Patent
Baracca et al.

(10) Patent No.: US 11,841,052 B2
(45) Date of Patent: Dec. 12, 2023

(54) SUPPORT ASSEMBLY FOR FOOD APPLICATIONS HAVING AN IMPROVED INNER SEAL

(71) Applicant: AKTIEBOLAGET SKF, Gothenburg (SE)

(72) Inventors: Fausto Baracca, Massa (IT); Andrea A. Bertolini, Carrara (IT); Pasquale Frezza, Aversa (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/712,284

(22) Filed: Apr. 4, 2022

(65) Prior Publication Data

US 2022/0325754 A1 Oct. 13, 2022

(30) Foreign Application Priority Data

Apr. 12, 2021 (IT) .................. 102021000008987

(51) Int. Cl.
 *F16C 33/72* (2006.01)
 *F16C 33/78* (2006.01)
 *F16C 33/80* (2006.01)
 F16C 23/08 (2006.01)

(52) U.S. Cl.
 CPC ........ *F16C 33/723* (2013.01); *F16C 33/7879* (2013.01); *F16C 33/7886* (2013.01); *F16C 33/7896* (2013.01); *F16C 33/805* (2013.01); F16C 23/084 (2013.01)

(58) Field of Classification Search
 CPC .... F16C 23/084; F16C 33/723; F16C 33/782; F16C 33/7879; F16C 33/7886; F16C 33/80; F16C 33/805; F16C 33/7896
 See application file for complete search history.

(56) References Cited

U.S. PATENT DOCUMENTS

| 2014/0130618 | A1  | 5/2014 | Klinglmair et al. |
| 2018/0100546 | A1* | 4/2018 | Ress ........................ F16C 19/06 |
| 2019/0010989 | A1* | 1/2019 | Falaschi .............. F16C 33/7863 |

FOREIGN PATENT DOCUMENTS

| EP | 2985482 A2 * | 2/2016 | .......... F16C 33/7886 |
| EP | 3425224      | 1/2019 | |
| JP | 5327590 B2 * | 10/2013 | .......... F16C 33/7876 |

OTHER PUBLICATIONS

Machine Translation of JP-5327590-B2 (Year: 2013).*
Machine Translation of EP-2985482-A2 (Year: 2016).*
Search Report for corresponding Italian Patent Application No. 10202100008987 dated Nov. 30, 2021.

* cited by examiner

*Primary Examiner* — Alan B Waits
(74) *Attorney, Agent, or Firm* — Reed Smith LLP

(57) ABSTRACT

A support assembly for movable, rotating or sliding shafts, having a bearing unit having an inner ring, an outer ring, and a row of rolling bodies interposed between the inner and outer rings, a casing, a cover for fluid sealing an opening of an internal seat of the casing, a rear sealing device on a side opposite the cover having a metal screen and a vulcanized rubber liner equipped with an axially outer first sealing lip and with an axially inner second sealing lip, an axially inner sealing device, having a first shield provided with a vulcanized rubber liner having a plurality of sealing lips, the outer ring having a step extending axially inward and provided with a second shield having a vulcanized rubber liner with a plurality of sealing lips.

14 Claims, 2 Drawing Sheets

SUPPORT ASSEMBLY FOR FOOD APPLICATIONS HAVING AN IMPROVED INNER SEAL

CROSS-REFERENCE FOR RELATED APPLICATIONS

This application is based on and claims priority to Italian Patent Application No. 102021000008987 filed on Apr. 12, 2021, under 35 U.S.C. § 119, the disclosure of which is incorporated by reference herein.

FIELD

This disclosure relates to a support assembly for food applications.

BACKGROUND

In the food industry, support assemblies may be fixed to a machine frame and provide a seal that prevents water and contaminants from entering the machine frame.

BRIEF DESCRIPTION OF THE DRAWINGS

The disclosure will now be described with reference to the attached drawings, which shows non-limiting exemplary embodiments, in which.

DETAILED DESCRIPTION

Figure 1:
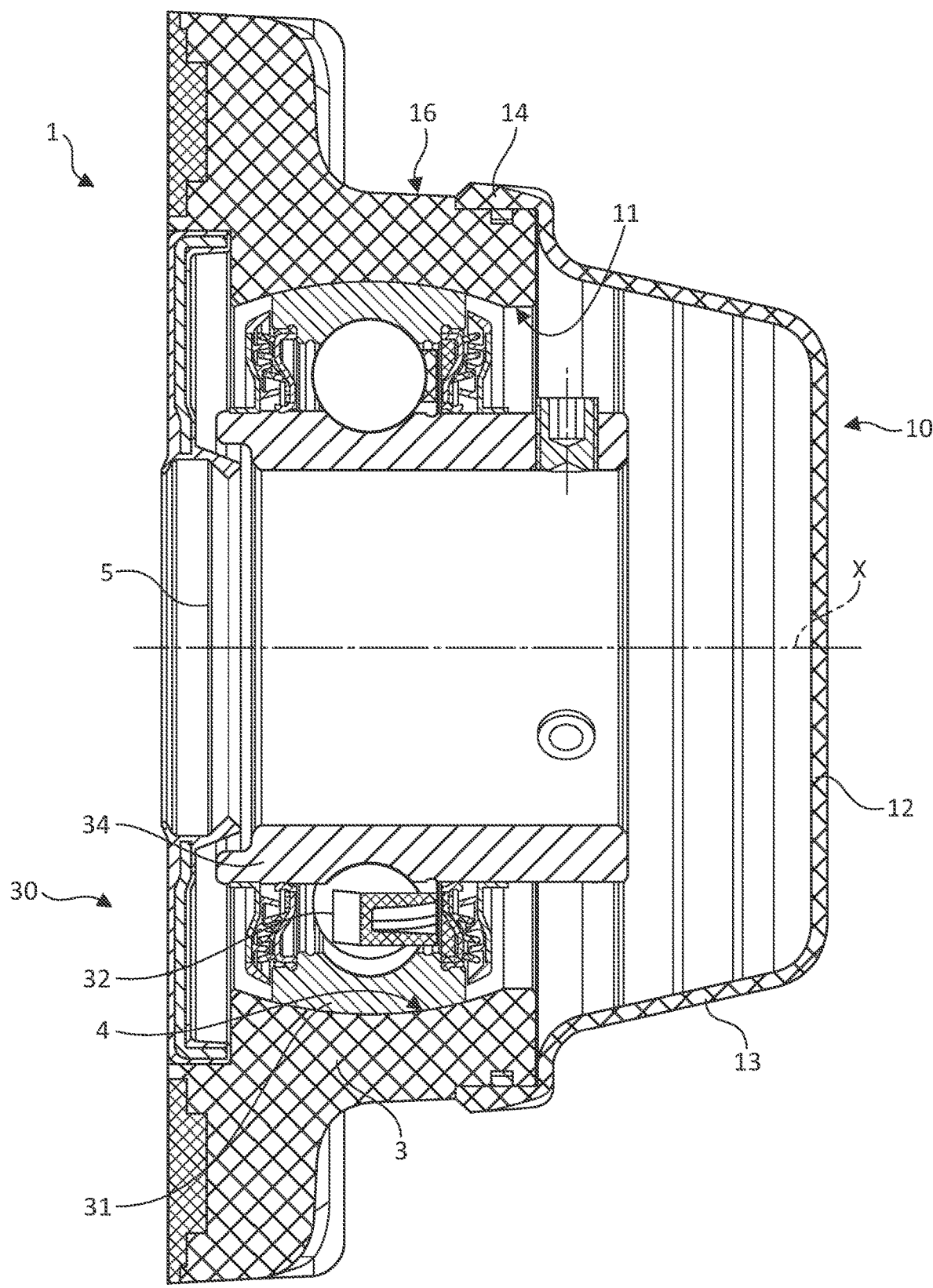
FIG. 1 shows a cross section through a support assembly according to exemplary embodiments in accordance with this disclosure.
Figure 2:
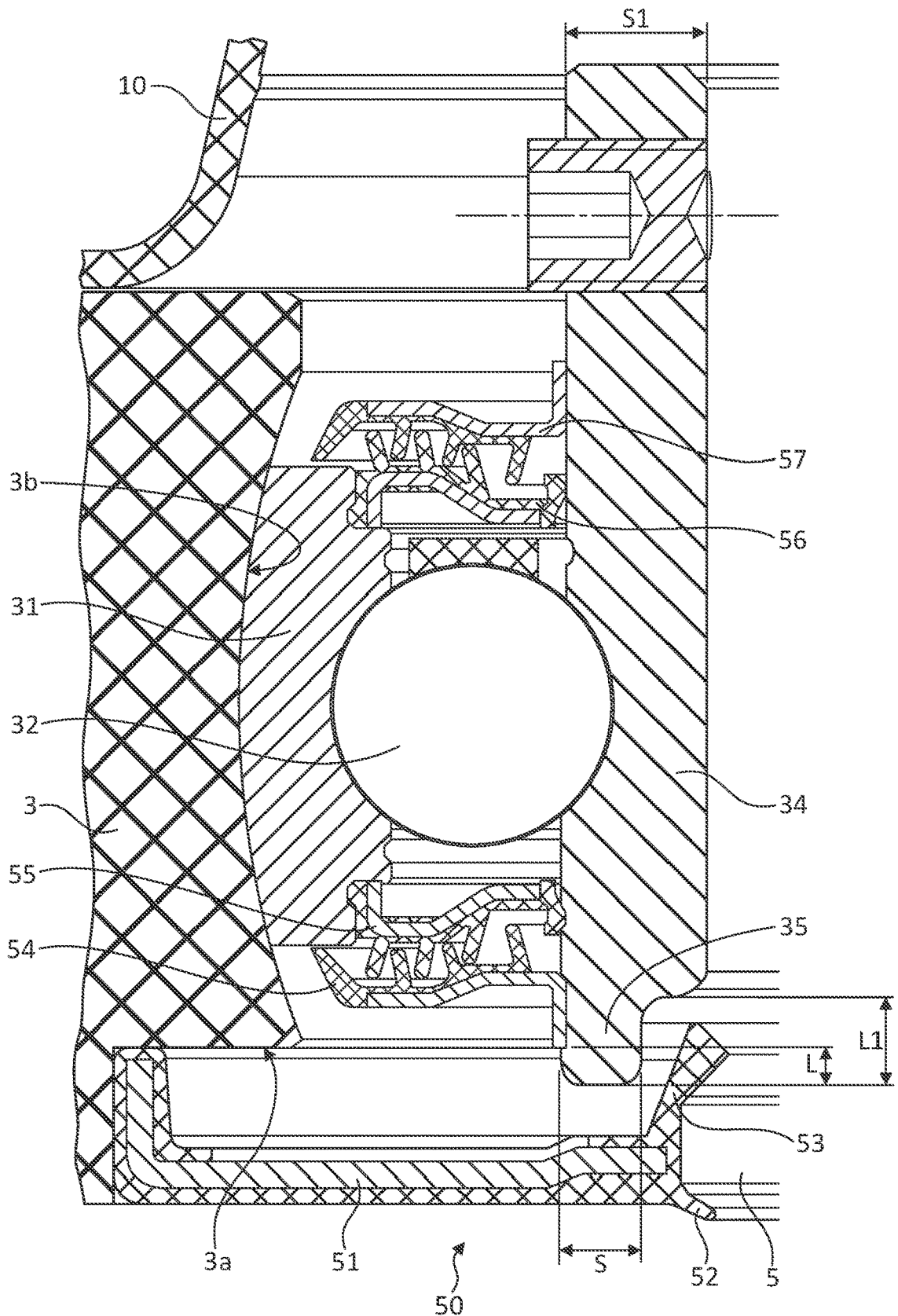
FIG. 2 shows a detail of FIG. 1 on an enlarged scale.

In the food industry (also known as "food and beverages", or simply "F&B") there is an increasing interest in the development of new machines and machine designs intended to improve the safety and quality of foods. Machines used in the food industry have numerous moving parts supported by rotating or slidable shafts, such as conveyor belts, mixers, and machines for washing fresh foods.

All these machines have to be cleaned frequently, usually with water to which detergents and/or disinfectants have been added, in order to control any development of bacterial colonies that might contaminate the foods. In particular, these machines may not have gaps or other parts where dirt, or even the washing water, can penetrate and stagnate. This is because the stagnation of liquids or moisture favours a possible proliferation of bacteria.

Support assemblies for movable shafts may be of a terminal type, housing a terminal end of the shaft, or of a through type. These support assemblies may be formed by a casing, which may be an annular casing, having a base or flange for fixing a bearing unit to a machine, the base or flange located inside the casing and coupled to a movable shaft, and a cover, which may be cup-shaped, that is coupled by a force fit to the casing in such a way that a coupling portion of the cover forms a fluid seal with a radially outer lateral surface of the casing. On a side opposite to the cover, a rear sealing device may also be provided, the sealing device including a metal shield onto which a vulcanized rubber element equipped with a plurality of sealing lips may be co-moulded.

In addition to a front seal between a cover and a casing and a rear sealing device, further sealing devices that may include a metal shield, onto which a vulcanized rubber element equipped with a plurality of sealing lips may be co-moulded, are provided to protect a bearing unit. In particular, one or more sealing devices may be positioned on an axially outer side and on an axially inner side of a row of rolling bodies. The axially outer sealing device may be formed by a pair of shields in which corresponding sealing lips face each other. The axially inner sealing device may include a single shield onto which a vulcanized rubber element with sealing lips is co-moulded.

In particular, in order to obtain certification for the IPx9k test, a support assembly may withstand high-pressure jets of hot water. Through tests conducted on known solutions have revealed that a rear part of the support assembly, opposite the cover, of known solutions do not withstand the conditions set by the test specifications. In other words, the lips of the axially inner seal do not ensure sealing for the water conditions specified below:

pressure: 80/100 bar
jet: 10/15 cm
temperature: 80° C.
flow rate: 14/16 l/min
time: 2 mins.

Most of the water enters a rear part of an assembly through the lips of a rear sealing device. In particular, a high-pressure water jet enters an interior of a support assembly because it lifts the lips of a rear sealing device under these conditions. More particularly, because of the high-pressure water jet, an axially outer lip of known solutions is lifted, in part because the interference is less than that of the axially inner lip. Thus we have identified that a problem of the axially inner lip, because of its shape and the flexibility of the rubber used in known solutions, it can easily be lifted by water under these conditions. This problem is further aggravated by the fact that such bearing units have a less effective sealing device in their axially inner parts. Consequently, water entering through a rear sealing device of a support assembly also enters an interior of a bearing unit, where it reaches the lubricant and the retaining cage. A device suffering such defects may not pass the certification test.

It is therefore necessary to define a support assembly that offers a novel design solution that is capable of resolving, or at least mitigating, the aforementioned drawbacks.

In order to substantially resolve the aforementioned technical problems, one object of the present disclosure is to define a novel support assembly for food applications, particularly a support assembly for a rotating shaft and a corresponding bearing unit fixed to a machine frame.

For this purpose, according to at least one aspect, in order to improve the fluid sealing performance of a support assembly on an inner side, that is to say on a side opposite a cover, a radially inner ring of a bearing unit may be provided with a step that extends in an axially inward direction and enables a further shield, in addition to known shield, to be accommodated, so as to provide a more effective axially inner seal.

Purely by way of non-limiting example and with reference to the attached figures, a support assembly 1 for a movable, rotating or slidable shaft, which for the sake of simplicity are not illustrated, may be described herein.

Throughout the present description and in the claims, terms and expressions indicating positions and orientations such as "radial" and "axial" are to be interpreted as relative to a central axis of rotation X of a bearing unit 30. On the other hand, expressions such as "axially outer" and "axially inner" relate to the assembled condition of a support assembly 1, and in the present case may relate to a cover side and to a side opposite the cover side, respectively.

In various embodiments a support assembly 1 may include a bearing unit 30 having a radially outer ring 31, a radially inner ring 34, and a row of rolling elements 32, such as balls, interposed between outer ring 31 and inner ring 34. Bearing unit 30 may be capable of receiving a movable shaft 5, such as a rotating shaft, in order to support bearing unit 30. Support assembly 1 may further include a casing 3 within which bearing unit 30 is housed.

In various embodiments, a casing 3 may have an annular overall shape, and may be designed to receive a bearing unit 30 through a seat 4. A seat 4 may have an overall axis of symmetry X which may coincide with an axis of symmetry of casing 3.

A support assembly 1 may further include a cover 10 for fluid sealing an opening 11 of a through seat 4 of a casing 3.

In various embodiments, a cover 10 for a casing 3 may be bowl-shaped and include a bottom wall 12, an annular lateral wall 13 extending transversely relative to bottom wall 12, and a coupling portion 14 facing towards casing 3. A coupling portion 14 may be annular and designed to couple laterally on an outside of casing 3. In some embodiments, a coupling portion 14 may be shaped as a socket joint and coupled radially and laterally on an outside of a radially outer lateral surface 16 of a casing 3.

In various embodiments, a lateral surface 16 and a coupling portion 14 may be defined by a solid of revolution and have a common axis of symmetry. In some embodiments, an axis of symmetry of lateral surface 16 and coupling portion 1 may coincide with an axis of symmetry X of a cover 10, a casing 3, and a seat 4.

In various embodiments, a support assembly 1 may be provided with a rear sealing device 50, placed on a side opposite a cover 10, and may include a metal shield 51. A vulcanized rubber liner equipped with a pair of sealing lips may be co-moulded onto metal shield 51. A pair of sealing lips may include a first, axially outer, sealing lip 52 and a second, axially inner, sealing lip 53. Sealing device 50 may be interference fitted on a casing 3 and may be in sliding contact with a shaft 5.

Additionally, inside a support assembly 1, there may be further sealing devices, each of which may include a metal shield onto which a vulcanized rubber element equipped with a plurality of sealing lips may be co-moulded, for the purpose of protecting a bearing unit 30. In various embodiments, sealing devices may be positioned both on an axially outer side and on an axially inner side of a row of rolling bodies 32. An axially inner sealing device may include a single shield 55, onto which a vulcanized rubber liner having a plurality of sealing lips may be co-moulded. Shield 55 may be interference fitted onto a radially outer ring 31 of bearing unit 30, and may be in sliding contact with a radially inner ring 34 of bearing unit 30.

In various embodiments, an axially outer sealing device may include a first shield 56, onto which a vulcanized rubber liner having a plurality of sealing lips is co-moulded, and a second shield 57, onto which a vulcanized rubber lining having a plurality of sealing lips may be co-moulded. Shield 56 may be interference fitted onto a radially outer ring 31 of a bearing unit 30, and may be in sliding contact with a radially inner ring 34. Shield 57 may be interference fitted onto radially inner ring 34 without being in sliding contact with radially outer ring 31 and, thus, forming a gap between second shield 57 and the radially outer ring 31. The corresponding pluralities of lips of first shield 56 and the corresponding plurality of lips of second shield 57 may face each other to form labyrinth seal, or "gutter seal," on an axially outer side of bearing unit 30.

In order to improve a fluid sealing performance of a support assembly 1 on an axially inner side, that is to say on a side opposite a cover 10, various embodiments of a support assembly 1 may include a radially inner ring 34 of a bearing unit 30 provided with a step 35. A step 35 may extend in an axially inward direction and may enable a shield 54 to be accommodated by interference mounting, in addition to an existing shield, e.g., 55, 56, 57, so as to provide a more effective axially inner seal. In various embodiments, a shield 54 may be provided with a vulcanized rubber element co-moulded onto and having a plurality of sealing lips.

An aim is therefore to increase a length of a radially inner ring 34 of a bearing unit 30 so that a shield 54 may be inserted into a rear part of bearing unit 30. In various embodiments, a corresponding plurality of lips of a shield 55 and a corresponding plurality of lips of a shield 54 may face each other and form a labyrinth seal, or "gutter seal," on an axially inner side of bearing unit 30.

A step 35 of a radially inner ring 34 may have a thickness S and radially inner ring 34 may have a radial thickness S1. In various embodiments, a thickness S may be greater than one half a thickness S1 in order to allow interference mounting of a shield 54 without causing problems of resistance and deformation.

In various embodiments, a projection L of a step 35 may be greater than 1.5 mm to allow provision of a flat surface of step 35 sufficient for mounting a shield 54, while also allowing formation of a labyrinth seal with a rear sealing device 50.

Step 35 may have an overall length L1. In various embodiments, L1 may be designed so that a minimum distance between step 35 and a sealing lip 53 of a rear sealing device 50 is not less than 0.2 mm, in order to prevent contact between step 35 and sealing lip 53.

A sealing performance of support assembly 1 is notably improved because, even if water enters from the lips of a rear sealing device 50, it must pass through the whole "gutter" sealing device formed by a shield 55 and a further shield 54 before it can enter a bearing unit 30. By introducing a step 35 of a radially inner ring 34, a water entering a bearing unit 30 may rebound against its surfaces and remain in a vicinity of the plurality of lips of a rear sealing device 50, distant from the "gutter seal."

Furthermore, when a shaft 5 is mounted, a plurality of radial lips of a rear sealing device 50 may be lifted. Because of this lifting and step 35 forming an elongated shape on radially inner ring 34, a labyrinth is created between a radial lip 53 and rear sealing device 50 and step 35 of radially inner ring 34. The higher the lip is, the smaller the labyrinth becomes, and the greater is the protection of the support assemblies.

Additionally, the novel step 35 is also compatible with a 2° rotation of the bearing unit 30 within a spherical seat 3b of a casing 3, because step 35 and second radial lip 53 of a rear sealing device 50 may not be in contact.

Finally, by forming a step 35 on a radially inner ring 34 and introducing a shield 54, exemplary a embodiments according to this disclosure may provide improved sealing of a bearing unit 30, improved resistance to contaminants, and an improved sealing performance of a support assembly 1. A sealing unit 1 as described in this disclosure may therefore be able to obtain IPx9k certification.

In various embodiments, a support assembly (1) for movable, rotating or sliding shafts (5), includes a bearing unit (30) adapted to receive the movable shaft, a casing (3) and a cover (10) for fluid sealing an opening (11) of an internal seat (4) of the casing (3); the bearing unit (30) comprising a radially outer ring (31), a radially inner ring (34) and a row of rolling bodies (32) between the radially outer ring (31) and the radially inner ring (34). The support assembly (1) may also be provided with a rear sealing device (50), placed on the opposite side with respect to the cover (10), and comprising a metal screen (51) and a vulcanized rubber liner equipped with a first sealing lip (52) axially outer and with a second sealing lip (53), axially inner; a sealing device axially internal with respect to the row of rolling bodies (32) comprising a single screen (55) provided with a vulcanized rubber liner having a plurality of sealing lip.

In various embodiments of a support assembly (1), from the opposite side with respect to the cover (10), the radially inner ring (34) is provided with a step (35) which extends in an axially internal direction and on which it is accommodated a further shield (54), provided with a vulcanized rubber liner having a plurality of sealing lips.

In various embodiments of a support assembly (1) the respective plurality of lips of the shield (55) and the further shield (54) face each other realizing a labyrinth seal.

In various embodiments of a support assembly (1) the further screen (54) is mounted with interference on the step (35) of the radially inner ring (34).

In various embodiments of a support assembly (1) the thickness (S) of the step (35) of the radially inner ring (34) is greater than 0.5×S1, (S1) being the thickness of the radially inner ring (34).

In various embodiments of a support assembly (1) the protrusion (L) of the step (35) with respect to an axially internal wall (3a) of the casing (3) is greater than 1.5 mm.

In various embodiments of a support assembly (1) the overall length (L1) of the step (35) ensures that the minimum distance between the step (35) and the second lip (53) of the rear seal device (50) is not less than 0.2 mm.

In various embodiments of a support assembly (1) the step (35) and the second lip (53) of the rear sealing device (50) are not in contact even if the bearing unit (30) is rotated up to 2° inside a spherical seat (3b) of the casing (3).

In addition to exemplary embodiments of the disclosure as described above, it is to be understood that there are numerous other variants. It is also to be understood that these embodiments are provided solely by way of example and do not limit the object of this disclosure or its applications or its possible configurations. On the contrary, although the description given above enables a person skilled in the art to implement the present disclosure according to at least one example of its embodiment, it is to be understood that numerous variations of the components described are possible without departure from the object of the disclosure as defined in the appended claims, which are interpreted literally and/or according to their legal equivalents.

We claim:

1. A support assembly for a shaft comprising:
    a bearing unit adapted to receive the shaft, the bearing unit comprising a radially outer ring, a radially inner ring, and a row of rolling bodies between the radially outer ring and the radially inner ring;
    a casing comprising an internal seat;
    a cover for fluid sealing an opening of the internal seat of the casing;
    a rear sealing device, placed on a side of the bearing unit opposite the cover, the rear sealing device comprising a metal screen and a vulcanized rubber liner equipped with a first sealing lip axially outer with respect to the metal screen and with a second sealing lip axially inner with respect to the metal screen; and
    an axially inner sealing device axially inner with respect to the row of rolling bodies and on the side of the bearing unit opposite the cover, the axially inner sealing device comprising a first shield provided with a vulcanized rubber liner comprising a first plurality of sealing lips,
    wherein the radially inner ring is provided with a step extending in an axially inner direction on the side of the bearing unit opposite the cover, the step provided with a second shield with a vulcanized rubber liner comprising a second plurality of sealing lips,
    wherein the step and the second lip of the rear sealing device are not in contact at a bearing unit angle of rotation of up to 2° inside the seat of the casing.

2. The support assembly according to claim 1, wherein the first plurality of lips of the first shield and the second plurality of lips of the second shield face each other and form a labyrinth seal.

3. The support assembly of claim 2, wherein the labyrinth seal is a gutter seal.

4. The support assembly according to claim 1, wherein the second shield is mounted on the step of the radially inner ring by interference.

5. The support assembly according to claim 1, wherein a radial thickness (S) of the step of the radially inner ring is greater than one half times a radial thickness of the radially inner ring.

6. The support assembly according to claim 1, wherein a protrusion (L) of the step with respect to an axially inner wall of the casing is greater than 1.5 mm.

7. The support assembly according to claim 1, wherein the step has an axial length (L1) such that a minimum distance between the step and the second lip of the rear seal device is not less than 0.2 mm.

8. The support assembly according to claim 1, wherein the internal set of the casing is a spherical seat.

9. The support assembly according to claim 1, further comprising an axially outer sealing device on the same side of the bearing unit as the cover comprising:
    a third shield having a vulcanized rubber liner with a third plurality of sealing lips, the third shield interference fitted onto the radially outer ring and in sliding contact with the radially inner ring; and
    a fourth shield comprising a vulcanized rubber liner with a fourth plurality of sealing lips, the fourth shield interference fitted onto the radially inner ring, wherein the first plurality of lips of the first shield and the second plurality of lips of the second shield face each other and form a labyrinth seal.

10. The support assembly according to claim 9, wherein a gap between the fourth shield of the axially outer sealing device and the radially outer ring is maintained.

11. The support assembly according to claim 9, wherein the labyrinth seal is a gutter seal.

12. The support assembly according to claim 9, wherein the third plurality of lips are co-molded onto the third shield of the axially outer sealing device and the fourth plurality of lips are co-molded onto the fourth shield of the axially outer sealing device.

13. The support assembly according to claim 1, wherein the first plurality of lips are co-molded onto the first shield and the second plurality of lips are co-molded onto the second shield.

14. A support assembly for a shaft comprising:
a bearing unit adapted to receive the movable shaft, the bearing unit comprising a radially outer ring, a radially inner ring, and a row of rolling bodies between the radially outer ring and the radially inner ring;
a casing comprising an internal seat;
a cover for fluid sealing an opening of the internal seat of the casing;
a rear sealing device, placed on a side of the bearing unit opposite the cover, the rear sealing device comprising a metal screen and a vulcanized rubber liner equipped with a first sealing lip axially outer with respect to the metal screen and with a second sealing lip axially inner with respect to the metal screen;
a sealing device axially inner with respect to the row of rolling bodies and on the side of the bearing unit opposite the cover, the axially inner sealing device comprising a first shield provided with a vulcanized rubber liner comprising a first plurality of sealing lips;
a step provided in the radially inner ring extending in an axially inner direction on the side of the bearing unit opposite the cover, the step provided with a second shield comprising a vulcanized rubber liner with a second plurality of sealing lips; and
an axially outer sealing device on the same side of the bearing unit as the cover comprising:
a third shield comprising a vulcanized rubber liner with a third plurality of sealing lips, the third shield interference fitted onto the radially outer ring and in sliding contact with the radially inner ring; and
a fourth shield comprising a vulcanized rubber liner with a fourth plurality of sealing lips, the fourth shield interference fitted onto the radially inner ring,
wherein the first plurality of lips of the first shield of the axially inner sealing device and the second plurality of lips of the second shield of the step face each other and form a labyrinth seal,
wherein the third plurality of lips of the first shield of the axially outer sealing device and the fourth plurality of lips of the second shield of the axially outer sealing device face each other and form a labyrinth seal,
wherein the second shield of the step is mounted on the step of the radially inner ring by interference,
wherein a radial thickness (S) of the step of the radially inner ring is greater than one half times a radial thickness of the radially inner ring,
wherein a protrusion (L) of the step with respect to an axially inner wall of the casing is greater than 1.5 mm, and
wherein the step has an axial length (L1) such that a minimum distance between the step and the second lip of the rear seal device is not less than 0.2 mm,
wherein the step and the second lip of the rear sealing device are not in contact at a bearing unit angle of rotation of up to 2° inside the seat of the casing.

* * * * *